Figure 1:
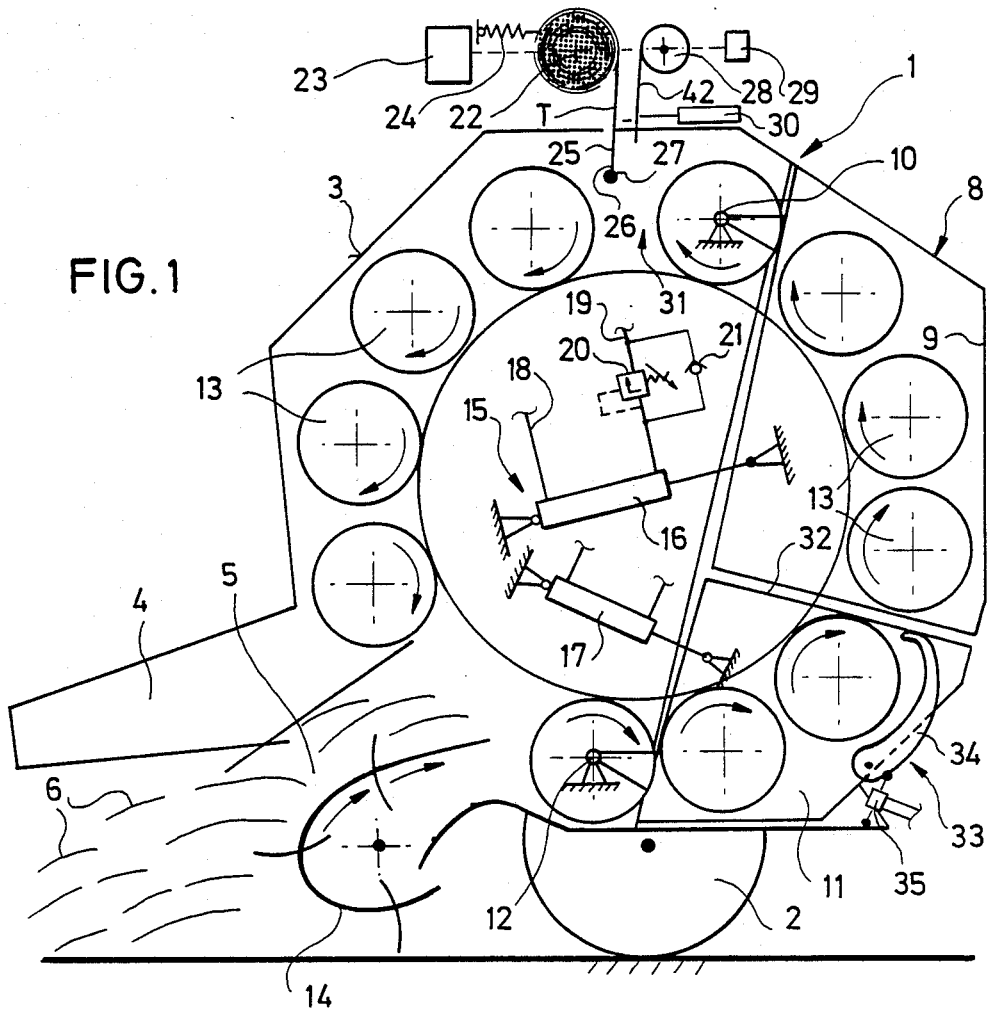

United States Patent [19]

Quataert

[11] Patent Number: 4,841,851

[45] Date of Patent: Jun. 27, 1989

[54] ROLL BALING PRESS FOR HARVEST PRODUCT

[75] Inventor: Pierre Quataert, Nuenen, Netherlands

[73] Assignee: P. J. Zweegers en Zonen Landbouwmachinenfabriek B.V., Netherlands

[21] Appl. No.: 172,300

[22] Filed: Mar. 23, 1988

[30] Foreign Application Priority Data

Mar. 30, 1987 [DE] Fed. Rep. of Germany ....... 3710550

[51] Int. Cl.$^4$ .......................... A01D 39/00; B30B 5/06
[52] U.S. Cl. .......................................... 100/5; 100/88; 100/89
[58] Field of Search .................... 100/5, 13, 88, 89; 56/341, 343, 344, DIG. 2

[56] References Cited

U.S. PATENT DOCUMENTS

| | | | |
|---|---|---|---|
| 4,514,969 | 5/1985 | Moosbrucker et al. | 100/88 X |
| 4,517,891 | 5/1985 | Henry | 100/88 |
| 4,580,398 | 4/1986 | Bruer et al. | 100/5 X |

*Primary Examiner*—Peter Feldman
*Attorney, Agent, or Firm*—Laff, Whitesel, Conte & Saret

[57] ABSTRACT

A roll baling press for harvest products for enabling a roll baling press to be operated in a continuous mode. A buffer store is formed for temporarily storing the continuously supplied harvest product during the typing and ejection of the finished roll bale. A flexible partition element (T) is provided in the roll-winding chamber (7) for temporarily establishing the buffer store (Z) within the roll-winding chamber (7).

28 Claims, 5 Drawing Sheets

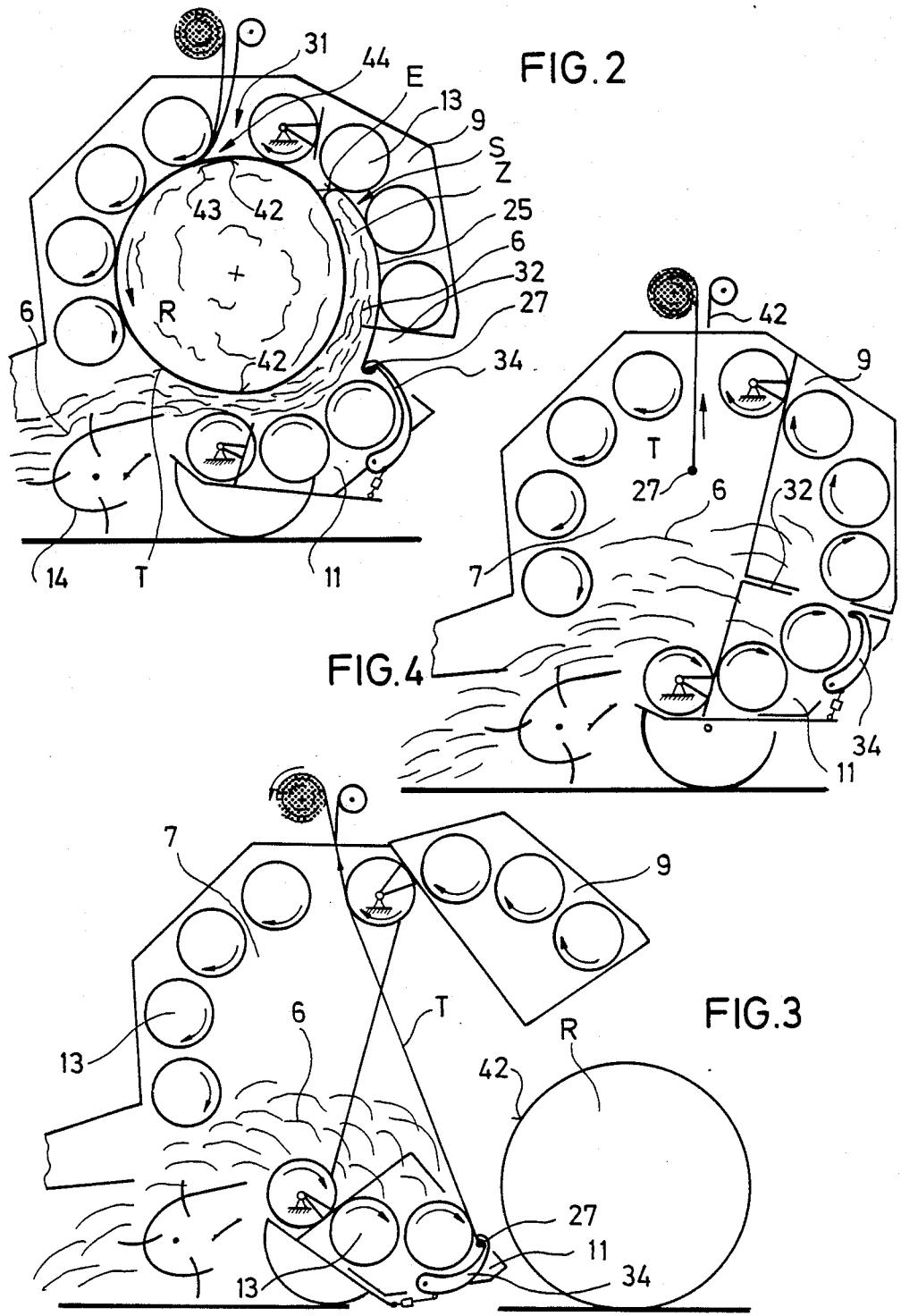

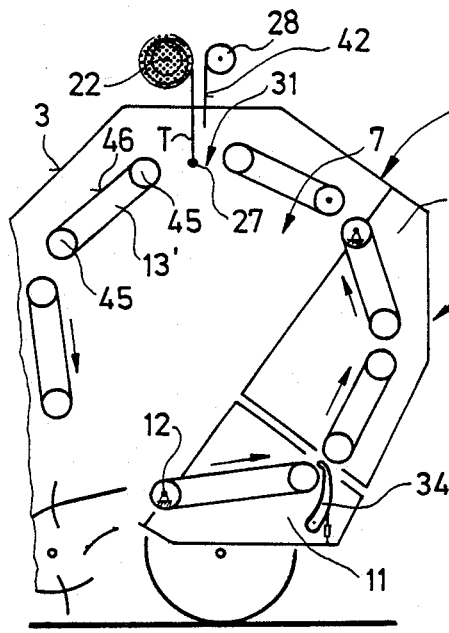
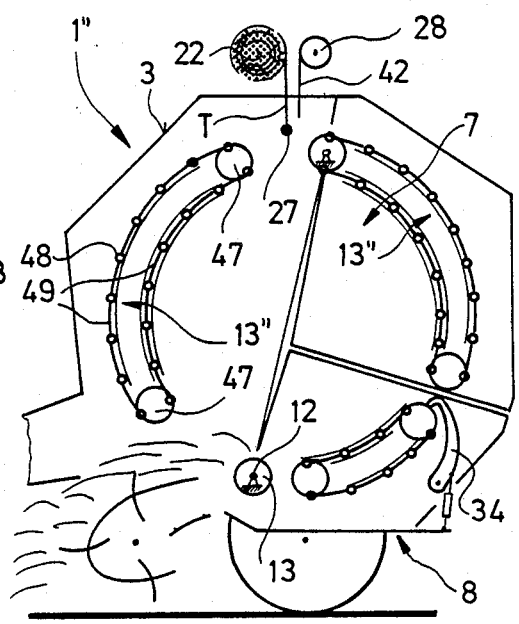
FIG. 7        FIG. 8
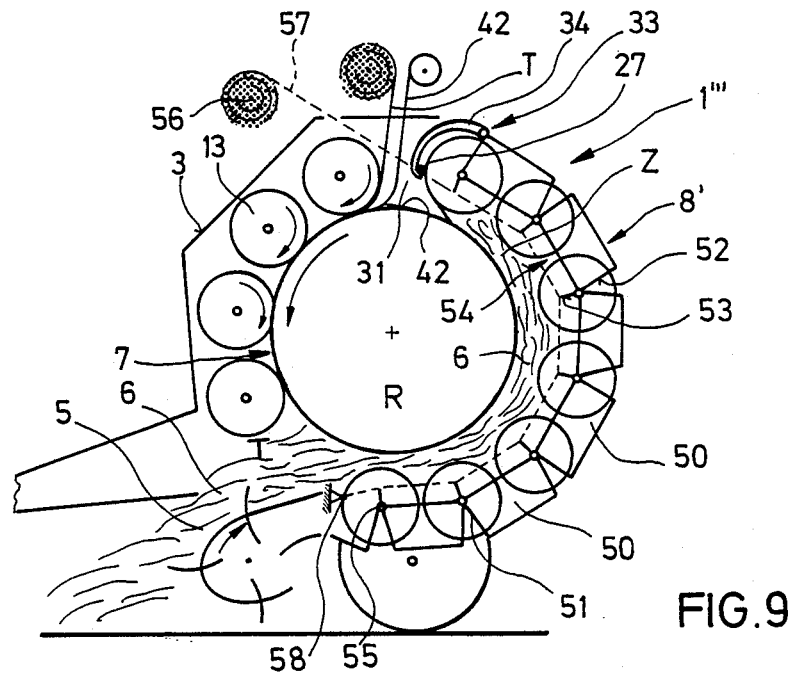
FIG. 9

ROLL BALING PRESS FOR HARVEST PRODUCT

DESCRIPTION

The present invention relates to a roll baling press of the type define in the generic clause of claim 1.

Known from DE-PS No. 33 11 330 is a roll baling press of this type, wherein the harvest product feeder passage is provided therein with an antechamber acting as the buffer store for the harvest product continuously picked up during the tying and ejection of the finished roll bale. Additionally provided in the feeder passage are movable elements operable to interrupt the feeding of the harvest product to the roll-winding chamber, so that the harvest product picked up during the respective period is stored in the buffer store. During the tying and ejection of the finished roll bale, up to about half of the harvest product to be contained in the next roll bale is being picked up, thus requiring the antechamber to have a considerable volume. This results in an undesirable increase of the size of the roll baling press housing. A further complication is introduced by the required actuating mechanism for the elements interrupting the supply of the harvest product to the roll-winding chamber during the tying and ejection phase. As a result, a roll baling press of this type is nearly twice as expensive as a conventional roll baling press for intermittent operation, which is scarcely acceptable for the end user.

In another roll baling press known from EP-A-No. 1-01 56 041, two roll-winding chambers are provided in a common housing, the first roll-winding chamber being operable to form a smaller roll bale which is then transferred to the second roll-winding chamber to be wound therein to its final size, while the winding of a subsequent roll bale is commenced in the first roll-winding chamber. This roll baling press is of excessively great dimensions and of complicated construction, giving rise to frequent malfunction and costly operation.

It is therefore an object of the invention to provide a roll baling press of the type defined in the introduction, which is characterized by a simple and compact construction and therefore less prone to malfunction.

This object is attained according to the invention by a roll baling press having the characteristics set forth in the characterizing clause of claim 1.

These characteristics result in a roll baling press of a simple and compact construction comparable to that of a intermittently operable roll baling press. In view of the fact, however, that the buffer store is adapted to be established within the roll-winding chamber, and that only for a transitory period during which a finished roll bale is to be tied and ejected, the roll baling press can be operated continuously, because the harvest product picked up during the tying and ejection of the finished roll bale is collected separately therefrom in the buffer store. The flexible partition element adapts itself to the contour of the finished roll bale to thereby compress the continuously supplied harvest product, which is retained in the roll-winding chamber as the finished and tied roll bale is being ejected, whereupon the stored product is immediately processed for forming a further roll bale. Apart from the elements required for controlling the operation of the partition element, the roll baling press according to the invention is scarcely different from an intermittently operable conventional roll baling press. Manufacture of this roll baling press is simple and cost-effective, so that the costs of this continuously operable roll baling press are scarcely higher than the costs of an only intermittently operable roll baling press.

An advantageous embodiment is disclosed in claim 2, in which the binding material is supplied during at least one revolution of the roll bale, wound about the outer periphery of the roll bale, and is then tied at its abutting end portions. The web-shaped partition element is inserted into the roll-winding chamber only for the period during which the buffer store is required for storing the continuously supplied harvest product. Subsequently the partition element is again retracted from the roll-winding chamber to thereby permit the roll-baling operation to be continued in the conventional manner.

Advantageous in this context are the characteristics of claim 3. As soon as the insertion end of the partition element has entered the roll-winding chamber, it is entrained by the roll bale past the outlet of the feeder passage, to be subsequently retained by the catcher and retainer mechanism. The roll bale meanwhile continues to be rotated, permitting it to be tied, and may subsequently be ejected in a simple manner, while the harvest product entering the roll-winding chamber from the feeder passage is collected separately from the finished roll bale.

These operations are facilitated by the characteristics of claim 4, because the partition element of the construction described prevents the supplied harvest product from advancing on the finished roll bale. The catch element is not only effective to facilitate the retention of the insertion end of the partition element, but also to act as a drag element for conveying the partition element towards the catcher and retainer mechanism practically without slippage.

The embodiment of claim 5 is particularly effective, because the specified materials of the partition element enable the partition element in the roll-winding chamber to form a loop of increasing size defining the buffer store. The partition element is resiliently flexible and deformable, and at the same time of sufficient tensile strength with a smooth surface, so that it is not subjected to excessive wear during operation.

An alternative embodiment is disclosed in claim 6. This partition element is particularly wear-resistant and therefore capable of withstanding the burdensome operating conditions in the roll baling press.

Further advantages are offered by the embodiment according to claim 7. The mechanical construction for controlling the operation of the partition element is of a simple and compact type. The partition element is retained on the housing in a wound state in the manner of a spring-biased roller blind. Its insertion end is then transferred to the roll bale and entrained thereby. As the finished roll bale is being ejected, the partition element is retracted and tensioned, resulting in the further advantage that the partition element exerts a force on the finished roll bale in the ejecting direction to thereby accelerate the ejection.

Further advantages may be obtained by the provision of claim 8. The unwinding brake is capable of generating a desirable slippage between the partition element and the finished roll bale to thereby assist in the ejection of the roll bale and to pre-compact the supplied harvest product in a desirable manner.

The characteristic of claim 9 offers the further advantage that the return spring automatically operates to retract the partition element and to thereby tension it during the ejection of the finished roll bale.

The characteristic of claim 10 is also expedient in that the crossbar can be readily caught and retained by the catcher and retainer mechanism, the crossbar being also effective to ensure that the partition element smoothly follows the rotation of the roll bale over its full width.

A structurally simple and operatively reliable embodiment is disclosed in claim 11. The catch hook is projected into the roll-winding chamber when the insertion end of the partition element approaches the catcher and retainer mechanism.

An important aspect is further disclosed in claim 12, it being ensured in this manenr that the binding material can be tied at its abutting end portions, or that a relatively long overlap of the ends of the binding material is obtained which is important with regard to reliable retention of the binding material on the finished roll bale.

The aspect of claim 13 is of importance with a view to avoiding fundamental alterations in the basic construction of approved roll baling presses. In the case of a common insertion opening for the binding material and the partition element, the binding material is preferably inserted so as to precede the insertion end of the partition element.

Another important aspect is disclosed in claim 14. The catcher and retainer mechanism is advantageously disposed beyond the outlet of the feeder passage, as seen in the winding direction, at a distance just sufficient for the formation of a buffer store of sufficient size when the insertion end of the partition element is caught and the partition element forms a loop which may not, however, reach the inlet opening for the binding material.

A particularly simple and effective embodiment is disclosed by claim 15. In this case, use is made of the force of gravity for introducing the insertion end of the partition element and the binding material into the roll-winding chamber, thus eliminating the need of specific actuator or feeder elements for this operation. The arrangement of the insertion openings and the catcher and retainer mechanism according to claims 14 and 15 results in the aditional advantage that the partition element in its tensioned state extends substantially diagonally through the roll-winding chamber, so that a strong ejection force acting on the finished roll bale is generated as the partition element is being tensioned.

A further particularly important embodiment of a roll baling press according to the invention is set forth in claim 6, wherein the ejection opening is adapted to be closed by a shell-type gate pivotally mounted on the housing at an upper location. In this embodiment, the partition element needs to be entrained only over a small fraction of the inner periphery of the roll-winding chamber, because the supplied harvest product continues to be fed to the roll bale about to be finished even while the binding material is being supplied. The partition element is only inserted when the leading end of the binding material approaches the feeder passage, whereupon the partition element passes the outlet of the feeder passage for subsequently separating the successively supplied harvest product from the finished roll bale. This implies also that the buffer store has to contain only a very small volume of the harvest product, that a desirably long overlap of the ends of the binding material is obtainable, and that it is possible to employ a structurally simple one-piece gate pivotally mounted at its upper portion. In this embodiment, however, the insertion of the partition element and the binding material is admittedly somewhat more difficult than in the case of the gravity-assisted insertion from above.

A further advantageous embodiment is set forth in claim 17. In this embodiment, the roll bale is at first wrapped nearly completely in the partitio element, with the exception of a short gap between the catcher mechanism and the insertion location of the partition element, this gap permitting the ends of the binding material to be tied or overlapped. The outlet of the feeder passage is covered by the partition element only for a short time, so that only a small amount of the harvest product subsequently supplied has to be stored in the buffer store. Up to this time the continuously supplied harvest product has been introduced under the binding material nearly over the full revolution of the roll bale. As soon as the ends of the binding material have been tied, the gate is opened and the finished roll bale is speedily ejected from the roll-winding chamber, the ejection being assisted by the subsequently supplied harvest product exerting a pressure force on the outer side of the partition element.

The embodiment according to claim 18 offers the advantage that the actuators ensure the accurately timed insertion of the binding material and the partition element at the beginning of the tying and ejection operations, respectively.

A further embodiment of independent inventive importance is disclosed in claim 19. This construction of the gate of the roll baling press is advantageous also for other types of roll baling presses, e.g. for intermittent operation, due to the fact that the roll bale exiting from the roll-winding chamber is positively guided along the inclined plane of the lower gate half until it rests on the ground. The inclined plane formed by the lowering of the lower gate half assists in the speedy ejection of the roll bale from the roll-winding chamber, this ejection operation being still further assisted by the press elements provided on the lower gate half. The upper gate half is lighter and therefore easier movable than a one-piece gate covering the entire ejection opening and pivotally mounted at its upper portion, so that the actuators for opening and closing the two gate halves may be simplified. In a roll baling press for intermittent operation, it was formerly required to stop for the tying operation, and even to back a certain distance for the ejection operation. The two-piece gate construction eliminates this backing need. If in the case of continuous operation a partition element is employed for defining the buffer store within the roll-winding chamber, the two-piece gate construction offers the advantageous possibility of increasing the volume of the roll-winding chamber by gradually opening the two gate halves as the buffer store is being successively filled, in response to the increasing reactive pressure of the harvest product, the partition element exerting a corresponding force on the finished roll bale to assist in the ejection operation.

In this context the embodiment of claim 20 is advantageous in that the housing-mounted press element forms a transition leading over to the lower gate half acting as the guide surface to the ground, this housing-mounted press element with its movement in the direction towards the lower gate half being effective to assist in the ejection of the roll bale.

A further advantageous embodiment is set forth in claim 21. These closing actuators result in the advantage that the gate halves start to open when the compaction of the roll bale has reached a predetermiend degree which may be sensed by the reactive pressure acting on the gate halves. At this instant the opening of the gate halves is automatically initiated, also against initially constant closing forces. This construction is particularly advantageous in combination with the employ of a partition element acting to form a buffer store in the roll-winding chamber. The successive filling of the buffer store causes the gate halves to be successively forced open, resulting in an increase of the volume of the roll-winding chamber, which is particularly advantageous for the storage of the supplied harvest product in the buffer store.

Further advantages are offered by the embodiment of claim 22, because this arrangement of the catcher and retainer mechanism results in that the partition element exerts an additional ejection force on the finished roll bale as it is being retracted and tensioned for the ejection operation.

Claim 23 discloses another advantageous embodiment of independent inventive importance. This gate construction is also advantageous for roll baling presses without a buffer store, because the need to raise the gate is eliminated, since the gate is merely lowered, for instance under its own weight. The provision of a rigid gate pivoted at its lower portion would not be possible, because the concave gate would prevent the finished roll bale from being ejected onto the ground by intercepting it in the manner of a crooked hand. According to the invention, however, the gate is composed of individual sections movably connected to one another and adapted in the opened state of the gate to form a straight run-off plate for cautiously and speedily guiding the roll bale onto the ground. The winding cylinders mounted on the gate accelerate the transfer of the roll bale to the ground. If a partition element is provided, the finished roll bale leaves the roll-winding chamber over the partition element acting to assist in the ejection operation as it is being retracted and tensioned. The straightening actuator meanwhile assists in establishing a stable run-off surface for the roll bale.

The aspect of claim 24 offers the advantage that the hinge axes between the gate sections can simultaneously act as the axes or shafts of the winding cylinders.

In this context the aspect of claim 25 is of importance, because in both configurations of the gate (convex wall portion and straight run-off plate) the individual gate sections are positively engaged with one another, so that the gate acts as a rigid structural unit in both of its configurations.

The provision finally of claim 26 offers the advantage that enables a voluminous buffer store to be formed without a pronounced loop formation of the partition element, because the gathering of the finished roll bale in the binding material is concluded immediately after the insertion end of the partition element has reached the catcher and retainer mechanism on the last gate section, so that the ejection of the finished roll bale may then immediately initiated. Also in this embodiment, the effective lever arm of the tensioned partition element is particularly capable of assisting in the ejection of the roll bale.

Figure 5:
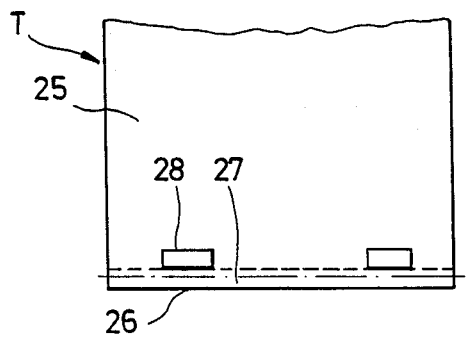
Figure 6:
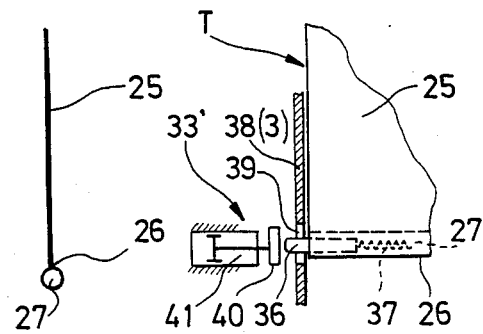
Figure 10:
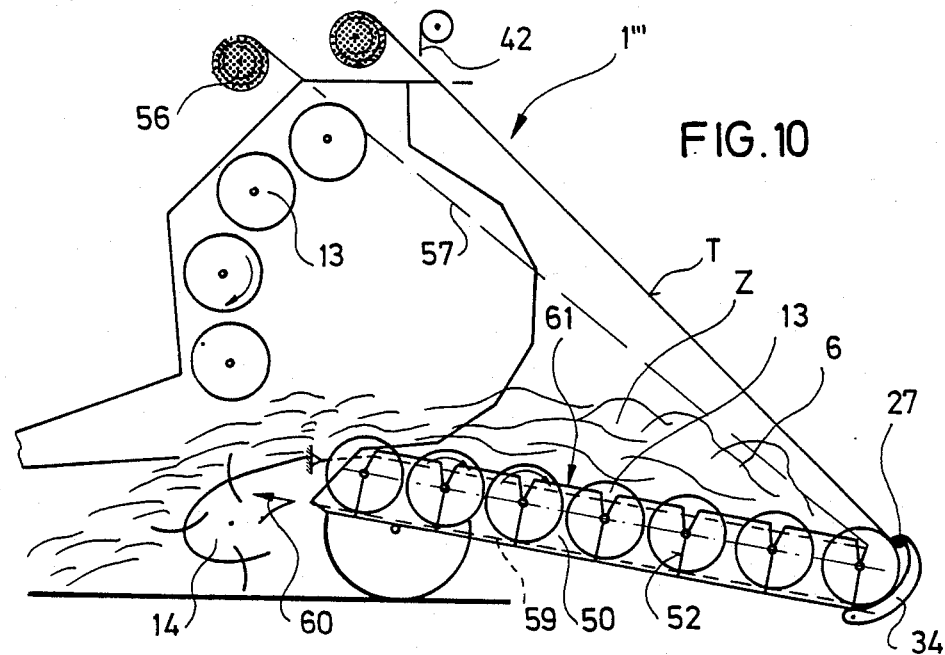
Figure 11:
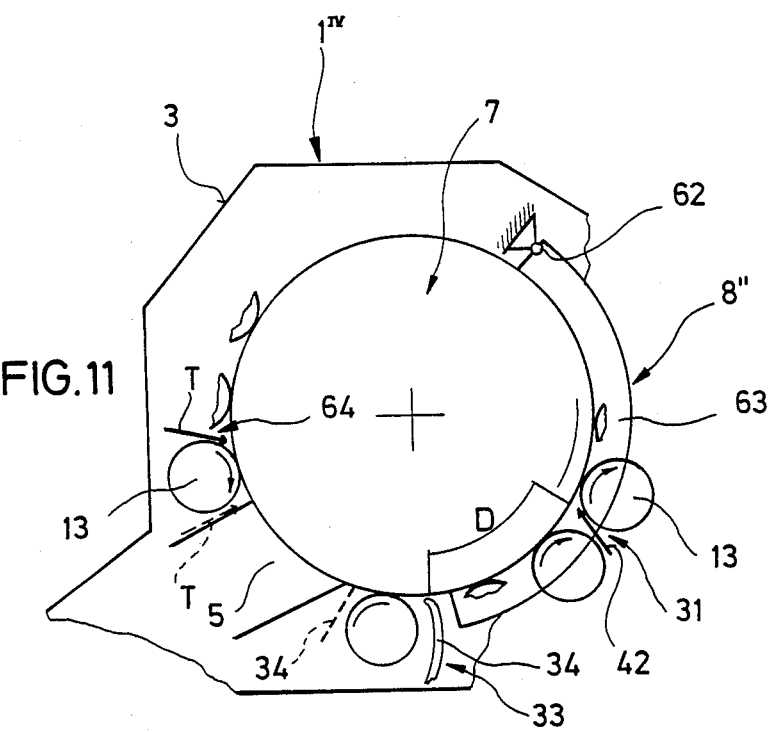
Figure 12:
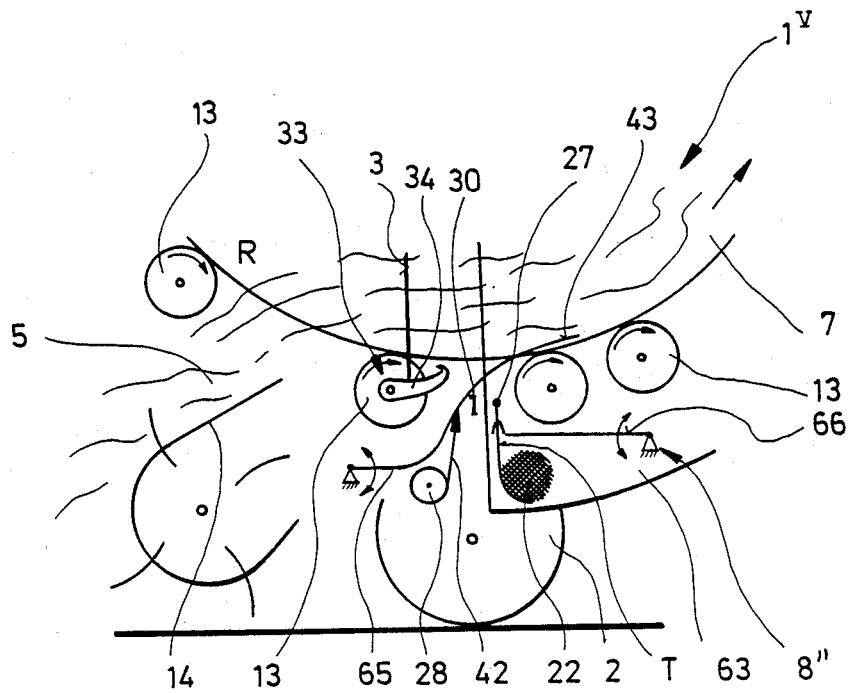

Embodiments of the invention shall now be described by way of example with reference to the accompanying drawings, wherein:

FIG. 1 shows a roll baling press in longitudinal section,

FIGS. 2, 3, 4 show simplified illustrations of the roll baling press of FIG. 1 during successive phases of operation, FIG. 5 shows a detail of the preceding figures, FIG. 6 shows a detail modification, FIG. 7 shows a roll baling according to a modified embodiment, FIG. 8 shows a further modified embodiment of a roll baling press, FIGS. 9, 10 show another embodiment of a roll baling press illustrating two operartive phases, FIG. 11 shows a strongly diagrammatical illustration of a further embodiment of a roll baling press, and FIG. 12 shows a partial illustration of still another embodiment of a roll baling press.

The roll baling presses 1, 1′, 1″, 1‴, $1^{IV}$ and $1^{V}$ shown in the figures are roll baling presses with a substantially rigid roll-winding or press chamber 7, that is, a roll-winding or press chamber with a volume which does not vary during operation of the roll baling press. The principle of transitionally forming a buffer store Z immediately within roll-winding chamber 7 as explained in the following is also applicable, however, to roll baling presses having a variable roll-winding or press chamber. For better understanding, however, the principle shall only be explained with reference to roll baling presses with a non-variable roll-winding or press chamber, as its illustration would be too difficult when applied to a roll baling press with a variable roll-winding or press chamber.

The roll baling press 1 shown in FIG. 1 has a housing 3 travelling on wheels 2 and equipped with a coupling bar 4. Roll bearing press 1 is conventionally pulled and powered by a tractor. Below coupling bar 4, a feeder passage 5 for a harvest product 6 extends obliquely upwards into a substantially cylindrical roll-winding chamber 7. Disposed opposite feeder passage 5 is an ejection opening closed by a gate 8 consisting of an upper and a lower gate half 9 and 11, respectively. Upper gate half 9 has its upper portion pivotally mounted in housing 3 about a transverse axis 10, while lower gate half 11 is pivotally mounted about a transverse axis 12 adjacent the outlet of feeder passage 5. Roll-winding chamber 7 is defined by winding cylinders 13 mounted at close circumferential spacings (just over 1 cm) and adapted to be rotated in the direction of respective arrows. The drive mechanism for rotating cylinders 13 is disposed at the outer sides (not shown) of housing 3. winding cylinders 13 are suitably formed with a grooved surface. They are all rotated in the same direction to result in a winding direction proceeding from gate 8 via the upper portion of roll-winding chamber 7 and down to the outlet of feeder passage 5. Disposed in feeder passage 5 is a product pickup and feeding mechanism 14 which is continuously operated for continuously feeding harvest product 6 to roll-winding chamber 7. This permits roll baling press 1 to be continuously operated.

Also provided at the sides of housing 3 are opening and closing actuators 15 for gate 8. In the embodiment shown, actuators 15 comprise respective double-acting hydraulic cylinders 16 and 17 for upper and lower gate half 9 and 11, respectively. Hydraulic cylinders 16 and 17 are supported on housing 3 and operable to open and close the respective gate half 9, 11 and to hold it in the closed position with a preset closing force. To this purpose, hydraulic pipings 18 and 19 are connected to both ends of each cylinder, for instance cylinder 16, hydraulic piping 19 for closing gate half 9 being provided with an adjustable pressure limiting valve 20 which is bypassed by a non-return valve 21. Non-return valve 21 may be of the releasable type permitting gate half 9 to be rapidly opened by supplying pressure medium via piping 18. Pressure limiting valve 20 acts to limit the pressure to such a degree that in response to a certain pressure within roll-winding chamber 7 gate half 9 starts to yield while still maintaining its counterpressure, until for instance non-return valve 21 is released, permitting gate half 9 to be pivoted upwards by a relatively small force. The same principle of operation is provided for lower gate half 11. Both gate halves 9 and 11 carry winding cylinders 13 mounted thereon.

Rotatably mounted on housing 3 above roll-winding chamber 7 is a core 22 having a web-like partition element T wound thereon. Core 22 is operatively connected to a rotary drive mechanism 23. In addition a return spring 24 may be provided for biasing core 22 in the windup direction of the partition element T in the manner of a roller blind. Partition element T which may for instance be a fabric web 25 such as a nylon fabric web having a plastic coating on both sides (cf. also FIGS. 5 and 6), is of the same width as roll-winding chamber 7 and has an insertion end 26 to which a catch element 27 is secured.

Upstream of core 22 in the winding direction housing 3 carries a rotatably mounted on roll 28 storing a binding material 42, for instance a netting web. Roll 28 is operatively connected to a rotary drive mechanism 29 operable to advance binding material 42 into roll-winding chamber 7. Additionally provided is a separator mechanism 30 operable to cut binding material 42 off after a predetermined length thereof has been unwound. Roll 28 might also be replaced by any other apparatus for holding a binding material in readiness and advancing it into the roll-winding chamber. An additional mechanism may also be provided for interconnecting the ends of the binding material wound about the finished roll bale.

Partition element T and binding material 42 enter roll-winding chamber 7 through an inlet opening 31 disposed between the two uppermost winding cylinders 13 the spacing of which is somewhat increased to this purpose. The size of inlet opening 31 is somewhat exagerated in the drawing.

In the closed state of gate 8, gate halves 9 and 11 define a closure joint 32 therebetween at a level somewhat below a horizontal plane containing the center axis of roll-winding chamber 7.

In this embodiment, lower gate half 11 carries a catcher and retainer mechanism 33 for cooperation with catch element 27 of partition element T. Mechanism 33 comprises a pivotally and shiftably mounted catcher hook 34 and an actuator cylinder 35. Catcher hook 34 is adapted to be projected into roll-winding chamber 7 at a location adjacent closure joint 32.

The configuration of insertion end 26 of partition element T is shown in FIG. 5. Catch element 27 is a crossbar wrapped into web 25 of partition element T and extending substantialy over the full width thereof. Openings 28 formed in web 25 facilitate the gripping of insertion end 25 by the catcher hook 34 of catcher and retainer mechanism 33.

Diagrammatically indicated in FIG. 6 is a different embodiment of a catcher and retainer mechanism 33'. In this embodiment, both ends of crossbar 27 in insertion end 26 of partition element T are provided with telescopically extensible pins 36 biased outwards by respective springs 37. Pins 36 slide along a wall 38 of housing 3 until they drop into recesses 39 in wall 38 to be retained therein. A plunger 40 opposite recess 39 is operable by means of a cylinder 41 to push the respective pin 36 back into crossbar 27, to thereby permit insertion end 26 of web 25 of partition element T to be retracted from the retained position.

The operation of roll baling press 1 shall now be explained with reference to FIGS. 1 to 4.

Roll-winding chamber 7 is initially empty as shown in FIG. 1. Harvest product 6 is conveyed into roll-winding chamber 7 through feeder passage 5. Gate 8 is closed. Gate halves 9 and 11 are kept in the closed state with a preset closing force. Catcher hook 34 is retracted. Insertion end 26 of partition element T and the free end of binding material 42 are suspended in inlet opening 31. The continuously supplied harvest product gradually fills roll-winding chamber while circulating in the winding direction. As roll-winding chamber 7 is gradually filled, harvest product 6 is compacted. Winding cylinders 13 are rotated. Harvest product 6 is porogressively compacted to form an initially still loosely packed roll bale to which the subsequently supplied harvest product is added in the form of a spiral layer on its outer periphery. The thus formed roll bale is successively compacted, so that the pressure exerted on gate 8 increases. A pressure sensor (not shown) determines the time at which the roll bale is sufficiently compacted. At this time insertion end 26 of partition element T and the free end of binding material 42 are permitted to enter through inlet opening 31 by the action of gravity. The entry of binding material 42 may precede that of partition element T. The rotating roll bale entrains binding material 42 and partition element T until catch element 27 has passed the outlet of feeder passage 5 and approaches closure joint 32. This causes partition element T and binding material 42 to be automatically unwound. At a predetermined instant catcher hooks 34 are projected into roll-winding chamber 7 so as to catch catch element 27 and to inhibit further movement of insertion end 26 of partition element T with the rotation of the roll bale (cf. FIG. 2). Since the roll bale continues to entrain partition element T, however, a loop S is formed between the outer periphery of roll bale R and winding cylinders 13 of upper gate half 9, the apex E of loop S advancing towards inlet opening 31 at half the peripheral speed of the rotating roll bale. As soon as catch element 27 has passed the outlet of feeder passage 5, the subsequently supplied harvest product 6 is no longer added to roll bale R, but is separated therefrom by partition element T. Loop S of partition element T acts as a buffer store Z for the subsequently supplied harvest product. During this phase of operation, the pressure acting on gate halves 9 and 11 increases, causing them to be forced in the opening direction against a given closing force, so that the volume of roll-binding chamber 7 is somewhat incresed. At this time the gradually opening closure joint 32 between gate halves 9 and 11 does not permit any harvest product to pass therethrough, because it is covered by partition element T.

As soon as the leading end 43 of binding material 42 reaches a location adjacent inlet opening 31 in the course of this movement, cutting mechanism 30 operates to cut the binding material off, whereupon the ends of binding material 42 are connected to one another in the conventional manner, for instance at overlapping portions 44.

The two hydraulic cylinders 16, 17 are then operated in the opening direction of gate halves 9 and 11, causing them to be rapidly opened in the manner of pincer jaws (FIG. 3). Lower gate half 11 is lowered to a position in which its winding cylinders 13, which are still being rotated, form a downwards inclined run-off path for the finished roll bale wrapped in binding material 42. At the same time drive mechanism 23 and/or return spring 24 act to retract and to thereby tension partition element T, to thereby assist in the ejection of roll bale R, so that it is deposited on the ground. The meanwhile supplied harvest product retained up to this time in buffer store Z is then permitted to expand in that part of roll-winding chamber 7 still partitioned off by partition element T.

Subsequently hydraulic cylinders 16, 17 are operated in the closing direction to thereby retract gate halves 9 and 11 towards the closed position (FIG. 4). At this time catcher hooks 34 are retracted to thereby release catch element 27 of partition element T, whereupon the latter is retracted to the position shown in FIG. 1. The formation of a subsequent roll bale is then initiated with the harvest product already supplied to roll-winding chamber 7.

Instead of employing pressure limiting valve 20 and its associated bypass non-return valve 21, it is also possible to provide an adjustable pressure release valve mounted at an accessible position for permitting the required closing force to be adjusted in accordance with the nature of the harvest product to be processed.

The roll baling press 1' of FIG. 7 differs from the previous described one by the construction of the winding or press element 13' in the form of belt-conveyor units defining roll-winding chamber 7. Each unit comprises a pair of spaced parallel rollers 45 supporting a single belt or a plurality of belts or ribbons. Although this results in a polygonal cross-section of roll-winding chamber 7, the counterpressure exerted by the roll bale as it is being formed causes belts 46 to be expanded outwards, so that a substantially cylindrical shape of the roll winding chamber is achieved for the formation of a cylindrical roll bale.

The roll baling press 1" of FIG. 8 is again provided with winding or press elements 13" in the form of belt conveyor units having driving rollers 47 and hinged link belts 48 additionally guided in arcuate guide slots 49. The remaining construction and the operation of this roll baling press 1" correspoond to those of the press of FIG. 1. Mounted adjacent the feeder passage is a single winding cylinder 13 with its axis of rotation coinciding with the pivot axis 12 of the lower half of gate 8.

The roll baling press 1'" according to FIGS. 9 and 10 comprises a plurality of winding cylinders 13 closely spaced about the periphery of roll-winding chamber 7. The difference lies in the construction of gate 8 of roll-winding chamber 7 for the ejection of roll bale R. In this embodiment, gate 8' is of one-piece construction and pivotable about a pivot axis at a lower position adjacent the outlet of feeder passage 5. Gate 8' extends to a location adjacent inlet opening 31 for partition element T and binding material 42. It is composed of transversely rigid box-shaped sections 50 hingedly connected to one another for movement about hinge axes 51 extending parallel to the axis of roll-winding chamber 7. Each section 50 has an outer stop surface 52 and an inner stop surface 53. Winding cylinders 13 are mounted on hinge axes 51 between sections 50. In the closed state of gate 8' shown in FIG. 9, sections 50 are engaged with one another at their inner stop surfaces 53 to thereby form an arcuate wall portion 54 with a radius of curvature corresponding to that of roll-winding chamber 7. To this purpose sections 50 are interconnected by a traction element 57, for instance a chain or a steel cable on each side, which is secured to a support 58 in the housing and adapted to be wound onto a drum 56 mounted on housing 3. The tractive force of traction element 57 is effective to maintain the proper shape of wall portion 54 even under the reactive pressure of roll bale R.

The catcher and retainer mechanism 33 for catch element 27 of partition element T is mounted on the last gate section 50, so that catcher hook 34 is adpated to be projected into inlet opening 31.

In the operative phase of roll baling press 1'" shown in FIG. 9, a roll bale R has just been finished. The free end of binding material 42 has reached a location adjacent inlet opening 31 and is being connected to the other end of binding material 42. Partition element T extends nearly completely around roll bale R. Its catch element 27 has been caught by catcher hooks 34. Buffer store Z is substantially filled with the successively supplied harvest product. The increasing interior pressure has caused traction element 57 to yield slightly to permit gate wall portion 54 to open accordingly. To this purpose roller 56 may be provided with an adjustable friction clutch. Roller 56 and core 22 of partition element T could also be driven by respective hydraulic motors which in the presence of tractive forces acting on traction element 57 or partition element T, respectively, act as a pump with its outlet connected to an adjustable pressure-release valve.

As soon as the ends of binding material 42 have been interconnected, traction element 57 is released, permitting gate wall portion 54 to be lowered about pivot axis 55 (FIG. 10). Gate sections 50 are interconnected by a straightening mechanism 59 composed for instance of lateral chains or steel cables and a tensioning device 60. Mechanism 59 operates to pivot gate sections 50 relative to one another until their outer stop surfaces 52 are in abutting engagement. In this state, gate sections 50 form a planar and rigid run-off plate 61 the surface of which is formed by winding cylinder 13. Run-off plate 61 extends obliquely downwards towards the ground. Concurrently with the above described operation, partition element T is retracted and thereby tensioned as described with reference to FIG. 1, to thereby assist in the ejection of the finished roll bale along run-off plate 61 to the ground.

As soon as the finished roll bale R has been ejected, the tension on traction element 59 is released and traction element 57 is again wound on roller 56, causing gate 8' to close. Shortly before gate 8' is fully closed, catcher hooks 34 are operated to release partition element T, permitting it to be retracted to the starting position shown in FIG. 1 in preparation of the next binding and ejection operation.

The roll baling press $1^{IV}$ shown in FIG. 11 differs from the one shown in FIG. 1 by the arrangement of its gate 8", which in this embodiment is of one-piece and rigid construction and pivotable about a pivot axis 62 at an upper location of the housing. The movements of gate 8" are controlled by a hydraulic cylinder (not shown) similar to hydraulic cylinder 16 of FIG. 1. Gate 8" comprises a rigid shell 63 with winding cylinders 13 mounted therein.

The inlet opening 31 for binding material 42 is located in the lower portion of gate 8″. The catcher and retainer mechanism 33 with its catcher hooks 34 is disposed in housing 3 upstream of the lower edge of gate 8″ at an arcuate distance "D" from inlet opening 31. Partition element T is inserted into roll-winding chamber 7 through an opening 64 upstream of the outlet of feeder passage 5 in the winding direction. As shown in dotted lines, partition element T could also be inserted at a location immediately upstream of the outlet of feeder passage 5, and catcher hooks 34 might be disposed immediately downstream of the outlet of feeder passage 5 in the roll-winding direction. This modification offers the advantage that the partition element would be required to have only a short length for storing only a small amount of the harvest product, because the partition element would only be required to form the buffer store over the small sector of the roll bale's rotation from inlet opening 64 to inlet opening 31 as the free end of binding material 42 proceeds along this sector. When the apex of the loop formed by partition element T after having been caught by catcher hooks 34 reaches a location adjacent inlet opening 31, binding material 42 forms an overlap of a length corresponding to twice the distance D. When the leading end of binding material 42 reaches partition inlet opening 64, the bale wrapping or binding operation is already more than half concluded, so that the actual conclusion of the binding operation and the ejection of the finished bale require only a short time. For this reason the buffer store need only store a small amount of the successively supplied harvest product. This embodiment requires, however, the provision of auxiliary devices for inserting the insertion end of partition element T and the leading end of binding material 42 into roll-winding chamber 7, the action of gravity being not applicable to this purpose. The tensioning of the partition element during the ejection operation again produces a force assisting in the ejection of the finished roll bale from roll-winding chamber 7.

The roll baling press $1^V$ of FIG. 12, of which only a lower portion is diagrammatically shown, has a gate 8″ of one-piece construction similar to roll baling press $1^{IV}$ of FIG. 11. Gate 8″ is pivotally mounted at an upper portion of the housing, so that roll bale R can be ejected downwards.

Roll baling press $1^V$ differs form the previous one by the provision that roll 28 for binding material 42 is mounted in housing 3 adjacent the closure joint of gate 8″, an insertion actuator 65 being provided at this location for applying the leading end of binding material 42 to the peripheral surface of roll bale R when required. Catcher hook 34 of the catcher and retainer mechanism is mounted on the axis of the winding cylinder 13 immediately following the outlet of feeder passage 5 in die winding direction. Core 22 of partition element T is mounted in the lower end portion of gate shell 63. Associated to partition element T is another insertion actuator 66 operable to apply catch element 27 of partition element T to the peripheral surface of the roll bale.

Approximately one revolution of roll bale R prior to its being finished, insertion actuator 65 operates to insert the leading end of binding material 42 into roll-winding chamber 7 to be entrained by the rotating bale. After the leading end 43 has passed the location whereat partition element T is to be inserted, insertion actuator 66 operates to insert catch element 27 of partition element T to be entrained by the rotating bale. Roll Bale R continues its rotation in unison with binding material 42 and partition element T. during which rotation the successively supplied harvest product is introduced under the binding material. The introduction of the harvest product under the binding material is only interrupted after catch element 27 has passed the outlet of feeder passage 5, the harvest product beding subsequently stored outwards of partition element T. After passing the outlet of feeder passage 5, catch element 27 is caught and retained by catcher hooks 34, permitting the ends of binding material 42 to be connected to one another. A binding material cutting device is again indicated at 30. The subsequently formed buffer store is rather small, comprising a small loop, if any, because the successive supply of the harvest product continues only over a very short period. During this period gate 8″ may already be permitted to gradually open against counterpressure, so that the successively supplied harvest product is not excessively compacted or backed up in the feeder passage.

As soon as the ends of binding material 42 have been connected to each other, gate 8″ is rapidly opened by pivoting upwards to thereby uncover the roll bale ejection opening. Catch element 27 is still retained by catcher hooks 34, so that retraction of partition element T causes the latter to be tensioned to thereby assist in the ejection of the finished roll bale. The speed at which the roll bale is ejected is not of particular importance, because the partition element in its tensioned state defines a large space for the introduction of the harvest product in a loosely packed condition.

After roll bale R has been ejected, gate 8″ is again closed. Prior thereto or at the same time, partition element T is rewound, with catch element 27 being finally released, until catch element 27 has resumed the position shown in FIG. 12.

I claim:

1. A roll baling press for harvest products, comprising a roll-winding chamber defined by press elements adapted to be driven in the winding direction, a product receiving and feeding mechanism in a feeder passage leading to said roll-winding chamber, a mechanism for supplying a binding material to said roll-winding chamber, and a buffer store for the temporary storage of a product received during the tying and ejection of a roll bale, characterized in that at least during said tying and ejection of said roll bale (R) a flexible partition element (T) is provided within said roll-winding chamber (7) for defining said buffer store (Z) within said roll-winding chamber (7).

2. A roll baling press according to claim 1, wherein said binding material is adapted to be supplied, to be wound about the outer periphery of the roll bale, and to be tied at its abutting portions during at least one revolution of said roll bale, characterized in that said partition element (T) is in the shape of a web, and that said press is further provided with a mechanism (22,23) for holding said partition element (T) at the ready and introducing it into said roll-winding chamber (7) during the tying revolution of said roll bale (R), and a retracting mechanism (23,24) for retracting said partition element (T) after ejection of the tied roll bale (R).

3. A roll baling press according to claim 1 characterized in that said partition element (T) has a leading insertion end (26), and that in the winding direction beyond the outlet opening of said feeder passage (5) there is provided a catcher and retainer mechanism (33) for temporarily retaining the leading insertion end (26) of said partition element (T).

4. A roll baling press according to claim 1 or 3, characterized in that said partition element (T) is of a width corresponding to that of said roll-winding chamber (7) and has said leading insertion end (26) provided with a catch element (27).

5. A roll baling press according to claim 1, characterized in that said partition element (T) is a coated textile web (25).

6. A roll baling press according to claim 1 characterized in that said partition element (T) is composed of hingedly interconnected sections, the axes of the hinged connections extending substantially parallel to the axis of said roll-winding chamber (7).

7. A roll baling press according to claim 1, characterized in that said partition element (7) is wound on a core (22) mounted outside of said roll-winding chamber (7) in the state of readiness, and that a drive mechanism (23) is provided to act on said core (22) for inserting the leading insertion end (26) of said partition element (T) into said roll-winding chamber (7) and for tensioning the unwound partition element (T) or retracing it, respectively.

8. A roll baling press according to claim 1, characterized in that it is provided with an unwinding brake for said partition element (T).

9. A roll baling press according to claim 1 characterized in that the unwound partition element (T) is subjected to the action of a return spring (24).

10. A roll baling press according to claim 4, characterized in that said catch element (27) is a crossbar secured to said leading insertion end (26) of said partition element (T).

11. A roll baling press according to claim 3, characterized in that said catcher and retainer mechanism (33) comprises at least one crossbar catcher hook (34) adapted to be extended into said roll-winding chamber (7).

12. A roll baling press according to claim 1, characterized in that said roll winding chamber (7) is provided with a partition element insertion opening (31,64) disposed between an inlet opening (31) for said binding material (42) and the outlet opening of said feeder passage (5) as seen in the winding direction.

13. A roll baling press according to claim 12, characterized in that said paratition element insertion opening (31) is combined with said inlet opening for said binding material (42).

14. A roll baling press according to claim 3, characterized in that said catcher and retainer mechanism (33) is disposed in the winding direction between the outlet opening of said feeder passage (5) and said inlet opening (31) for said binding material (42).

15. A roll baling press according to claim 1, charcterized in that said binding material (42) and said partition element (T) are introduced at an upper location of said roll-winding chamber (7) by the action of gravity.

16. A roll baling press according to claim 12, wherein the ejection opening is adapted to be closed by a shell-type gate pivotally mounted at an upper portion of the housing, characterized in that the partition element insertion opening (64) is disposed upstream of the outlet opening of said feeder passage (5) and adjacent thereto in the winding direction, that said inlet opening (31) for said binding material (42) is formed in said gate (8''), in the lower half thereof, and that said catcher and retainer mechanism (33) is disposed between the outlet of said feeder passage (5) and the lower closure joint between said gate (8'') and said housing (3).

17. A roll baling press according to claim 16, characterized in that said partition element (T) is disposed in said upwards pivotable gate (8'') adjacent the lower closure joint thereof, that said binding material (42) is disposed in said housing (3) between said partition element (T) and the outlet of said feeder passage (5), and that said catcher and retainer mechanism (33) is disposed in said housing (3) between the outlet of said feeder passage (5) and said binding material.

18. A roll baling press according to claim 16, characterized in that it is provided with mechanical actuators (65,66) for the insertion movements of said binding material (42) and said partition element (T).

19. A roll baling press, according to claim 1, comprising a roll-winding chamber defined by press elements adapted to be driven in the roll-winding direction, a product pickup and feeder mechanism including a feeder passage leading to said roll-winding chamber, a mechanism for supplying a binding material to said roll-winding chamber, and a buffer store for the temporary storage of product picked up during the tying and ejection of the roll bale, said press elements being winding units distributed about the periphery of said press elements being mounted on at least one gate pivotally mounted on the housing and operable for ejecting a roll bale from said roll-winding chamber, characterized in that said gate (8) comprises a lower half (11) pivotally mounted adjacent said feeder passage (5), and an upper half (9) pivotally mounted adjacent an upper portion of said roll-winding chamber (7), that said gate halves (9, 11) are movable relative to one another in the manner of pincer jaws to form a closure joint (32) in their closed stae, that said closure joint (32) lies below a horizontal plane containing the roll-winding chamber axis, and that said lower gate half (11) is adapted to be pivoted downwards to a position in which the top surfaces of the press elements (13, 13', 13'') mounted on this gate half are at a lower level than the lowermost point of said roll-winding chamber (7) in the closed state of said gate (8).

20. A roll baling press according to claim 19, characterized in that a press element (13, 13') is mounted at a fixed position relative to said housing between the outlet of said feeder passage (5) and said lower gate half (11), the pivot axis (12) of said lower gate half (11) being substantially coincident with the pivot axis of this press element (13, 13').

21. A roll baling press according to claim 19, characterized in that said gate halves (9, 11) are operatively connected to closing actuators (15) in the form of double-acting hydraulic cylinders (16, 17) operable to exert a predetermined closing force of a limited magnitude with respect to the counterpressure of the harvest product (6), to thereby permit said gate halves (9, 11) to yield in the opening direction and to thus increase the volume of said roll-winding chamber (7) as the roll bale (R) is being tied and said buffer store (Z) is being filled.

22. A roll baling press according to claim 19, characterized in that said catcher and retainer mechanism (33) is disposed on said lower gate half (11) at a location adjacent said closure joint (32).

23. A roll baling press, particularly according to claim 1, comprising a roll-winding chamber defined by winding cylinders adapted to be driven in the winding direction, a product pickup and feeder mechanism including a feeder passage leading to said roll-winding chamber, a mechanism for supplying a binding material to said roll-winding chamber, and a buffer store for the temporary storage of product picked up during the tying and ejection of a roll bale, an ejection opening of said roll-winding chamber being adapted to be closed by a gate pivotally mounted on the housing of the press, characterized in that said gate (8') is pivotable about a pivot axis (55) located at a lower position adjacent the outlet of said feeder passage (5), that said gate (8') is composed of a plurality of sections (50) pivotable relative to one another about respective pivot axes (51) extending substantially parallel to the roll-winding chamber axis, said sections (50) forming an arcuate wall portion (54) of said roll-winding chamber (7) in the closed state of said gate (8'), and a straight roll-off plate (61) for a roll bale (R) extending out of said roll-winding chamber (7) in the open state of said gate (8'), and that a top portion of said housing (3) carries a gate closing actuator (56, 57) engaging the last gate section (50), and a roll-off plate straightening actuator (60, 59) mounted at a lower portion of housing (3).

24. A roll baling press according to claim 23, characterized in that the pivot axes (51) between said gate sections (50) approximately coincide with the axes of said winding cyclinders (13).

25. A roll baling press according to claim 23, characterized in that said gate sections (50) are pivotable relative to one another over a limited range so as to be rigidly engaged with one another when forming said wall portion (54) and when forming said roll-off plate (61).

26. A roll baling press according to claim 23, characterized in that said catcher and retainer mechanism (33) is associated to the last free section (50) of said gate (8').

27. A roll baling press according to claim 1, characterized in that said partition element (T) is a netting or grid web.

28. A roll baling press according to claim 1, characterized in that said partition element (T) is a plastic or metal foil.

* * * * *